F. C. STEVENS.
TOOTHED CYLINDER.
APPLICATION FILED JULY 9, 1909.
1,022,896.
Patented Apr. 9, 1912.
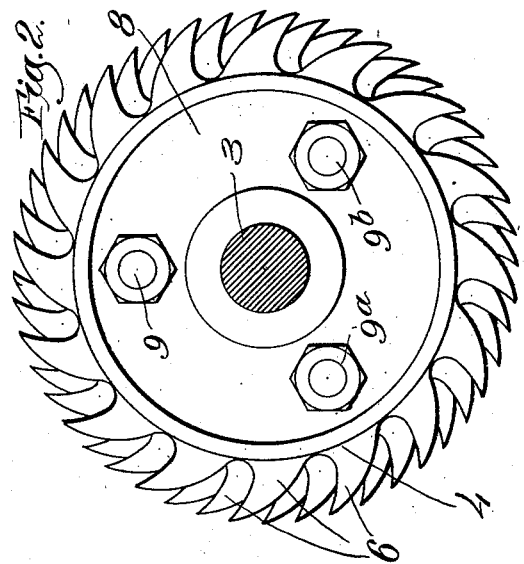
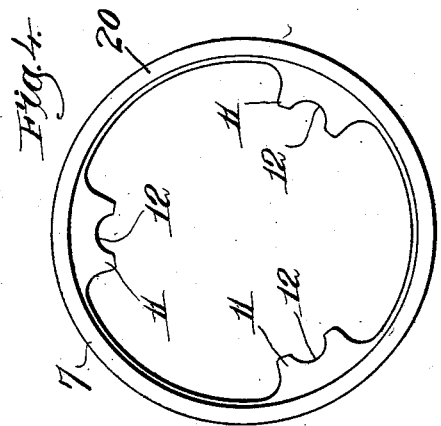
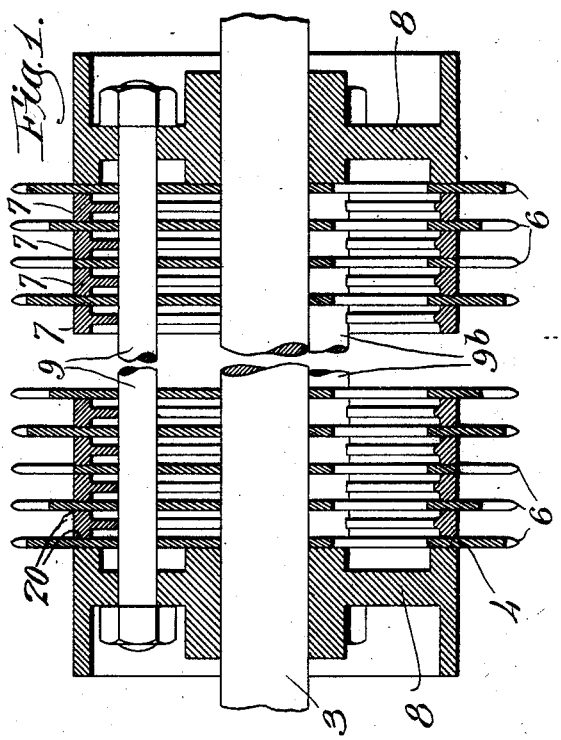
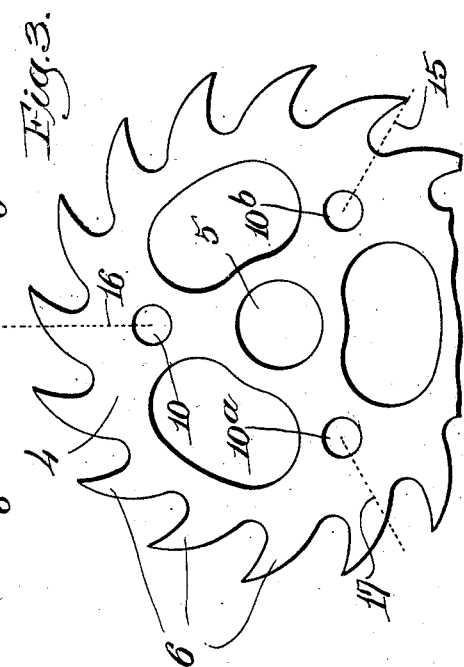
Witnesses.
Thomas J. Drummond.
Joseph M. Ward.
Inventor.
Frank C. Stevens,
by Dursley Gregory. Attys.

UNITED STATES PATENT OFFICE.

FRANK C. STEVENS, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

TOOTHED CYLINDER.

1,022,896. Specification of Letters Patent. Patented Apr. 9, 1912.

Application filed July 9, 1909. Serial No. 506,650.

*To all whom it may concern:*

Be it known that I, FRANK C. STEVENS, a citizen of the United States, residing at North Andover, county of Essex, and State of Massachusetts, have invented an Improvement in Toothed Cylinders, of which the following description, in connection with the accompanying drawing, is a specification, like characters on the drawing representing like parts.

This invention has for its object to provide a novel toothed cylinder capable of being used in pickers or similar machines, which cylinder has an all-metal construction and which can be inexpensively made and which can be easily repaired if any of the teeth become broken.

The features wherein my invention reside will first be described in the following specification and will then be pointed out in the annexed claims.

Referring to the drawings wherein one embodiment of my invention is shown, Figure 1 is a longitudinal section through a cylinder made in accordance with the invention; Fig. 2 is an end view; Fig. 3 is a view of one of the toothed disks; Fig. 4 is a view of the spacer.

The cylinder comprises a plurality of toothed disks which are mounted on a shaft and which are confined between two heads, a plurality of spacers situated between the disks and properly spacing them from each other, and bolts extended from one head to the other and through the disks and clamping the whole firmly together.

The disks are all alike but the location of the bolts is such that by placing the various disks in different angular positions, the teeth thereon will have a staggered relation to each other. The shaft on which the roll is mounted is shown at 3 and the toothed disks are shown at 4. Each disk has a central aperture 5 of a size to receive the shaft 3 and is provided on its periphery with a plurality of teeth 6. Situated between the disks and spacing them from each other are spacing rings 7. The disks are confined between two heads 8 which are made fast to the shaft 3 and the heads, disks and spacing rings are all tied together by tie-rods 9, 9ª, 9ᵇ which extend through the heads and through apertures 10, 10ª, 10ᵇ in the toothed disks. Each spacing ring 7 is shown as provided with a plurality of inwardly-directed positioning lugs 11, each of which has a recess 12 adapted to receive a tie-rod so that when the spacing rings are in place, the positioning lugs prevent them from turning.

The spacing rings are each provided with the annular bearing face 20 on each side, which bearing faces have a bearing against the toothed disks. When the disks and spacing rings are clamped together by the tie-rods, as shown in Fig. 1, each disk has a firm bearing against the bearing faces 20 of the spacing rings, and since these bearing faces are continuous, each disk is firmly held throughout a zone situated just inside of the teeth. In this way the disks are prevented from springing or from lateral play and a rigid cylinder is secured.

In toothed cylinders it is desirable that the teeth should have a staggered relation to each other. In order to secure this end and yet have all the toothed disks alike, I propose to arrange the tie-rods symmetrically or equal distance apart and also to make the number of teeth on each disk indivisible by the number of the tie-rods. For instance, in the present embodiment of the invention there are three tie-rods 9, 9ª, 9ᵇ situated equidistant from each other, and each toothed disk 4 has sixteen teeth 6. As a result the radial lines extending through the apertures 10, 10ª, 10ᵇ of each disk have a relation to the teeth such as shown by the dotted lines 15, 16, 17 in Fig. 3, that is, while the radial line 15 passes through the point of a tooth the radial line 16 will extend back of the point of a tooth one-third of the distance between two adjacent teeth, while the radial line 17 will extend through a point two-thirds of the distance between two adjacent teeth.

In building up the cylinder the successive disks are placed on the tie-rods in different angular positions, that is, one disk will be placed with the tie-rod 9 extending through the aperture 10, the tie-rod 9ª extending through the aperture 10ª, and the tie-rod 9ᵇ extending through the aperture 10ᵇ. The next disk will be placed with the tie-rod 9 extending through the aperture 10ᵇ, tie-rod 9ª extending through the aperture 10, and tie-rod 9ᵇ extending through the aperture 10ª, and the next disk will be placed with the tie-rod 9 extending through the aperture 10ª, the tie-rod 9ª extending through the aperture 10$^b$, the tie-rod 9$^b$ extending through the aperture 10. This may be done because the three tie-rods are symmetrically arranged, and the apertures 10, 10$^a$ and 10$^b$ in each disk are also symmetrically arranged. When the disks are assembled in this way, they will have a staggered relation to each other shown in Fig. 2, and this staggered relation is secured without the necessity of making three different types of disks.

From the above it will be seen that the cylinder comprises merely the two heads, a plurality of similar toothed disks, a plurality of similar spacing rings, and a plurality of similar tie-rods, and that by properly assembling the disks the desired staggered relation of the teeth can be secured. If any tooth or teeth becomes broken the disk bearing such teeth can be readily removed and a new disk put in place. Moreover, by having the spacing rings each formed with the annular bearing surfaces 20 on each side thereof, each disk will be clamped between two spacing rings in a circle immediately inside of the teeth and will thus be held firmly against any tendency to spring or yield.

My improved toothed cylinder is inexpensive to manufacture and easy to repair.

Having fully described my invention, what I claim as new and desire to secure by Letters Patent is:—

1. In a toothed cylinder, the combination with a shaft having two opposed heads, of a plurality of toothed disks situated between said heads and each having an aperture to fit the shaft, annular spacing rings situated between the disks, tie rods connecting the heads, said tie rods extending through the disks and clamping the heads, disks and spacing rings solidly together, said spacing rings being situated exterior to the tie rods and each spacing ring having on its inner face notches to engage the tie rods and by which said rings are centered, the diameter of the spacing rings being such relative to that of the disks that said rings engage and clamp the disks adjacent the roots of the teeth thereon.

2. In a toothed cylinder, the combination with a shaft having two opposed heads thereon, of a plurality of similar toothed disks mounted on said shaft, and each having a plurality of symmetrically-arranged openings therein, spacing rings situated between said disks and a pluarlity of tie-rods connecting said heads and extending through said openings, the number of the teeth on each disk being indivisible by the number of the tie-rods and being progressively arranged with relation to said openings, whereby the disks may be placed with their teeth in staggered relation to each other.

In testimony whereof, I have signed my name to this specification, in the presence of two subscribing witnesses.

FRANK C. STEVENS.

Witnesses:
Geo. C. Dickey,
J. Gerald Miller.

---

Copies of this patent may be obtained for five cents each, by addressing the "Commissioner of Patents, Washington, D. C."